United States Patent
Yoshizawa et al.

(10) Patent No.: US 10,676,607 B2
(45) Date of Patent: Jun. 9, 2020

(54) SOLUTION FOR FORMING SURFACE PROTECTIVE RESIN MEMBER, SOLUTION SET FOR FORMING SURFACE PROTECTIVE RESIN MEMBER, AND SURFACE PROTECTIVE RESIN MEMBER

(71) Applicant: FUJI XEROX CO., LTD., Tokyo (JP)

(72) Inventors: Hisae Yoshizawa, Minamiashigara (JP); Yoshihiro Inaba, Minamiashigara (JP); Fumiaki Mera, Minamiashigara (JP); Takako Kobayashi, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 99 days.

(21) Appl. No.: 16/162,784

(22) Filed: Oct. 17, 2018

(65) Prior Publication Data
US 2020/0010661 A1 Jan. 9, 2020

(30) Foreign Application Priority Data
Jul. 4, 2018 (JP) .................... 2018-127860

(51) Int. Cl.
| | | |
|---|---|---|
| C08L 33/16 | (2006.01) | |
| C08G 18/28 | (2006.01) | |
| C08G 18/42 | (2006.01) | |
| C08G 18/48 | (2006.01) | |
| C08G 18/73 | (2006.01) | |
| C08G 18/76 | (2006.01) | |
| C08L 67/04 | (2006.01) | |
| C08L 71/02 | (2006.01) | |
| C08L 33/08 | (2006.01) | |

(52) U.S. Cl.
CPC .......... *C08L 33/16* (2013.01); *C08G 18/2885* (2013.01); *C08G 18/4269* (2013.01); *C08G 18/4829* (2013.01); *C08G 18/735* (2013.01); *C08G 18/7621* (2013.01); *C08L 33/08* (2013.01); *C08L 67/04* (2013.01); *C08L 71/02* (2013.01); *C08L 2201/56* (2013.01); *C08L 2203/16* (2013.01)

(58) Field of Classification Search
CPC .......... C08L 33/16; C08L 33/08; C08L 67/04; C08L 71/02; C08L 2201/56; C08L 2203/16; C08G 18/2885; C08G 18/4269; C08G 18/736; C08G 18/7621
USPC ......................................................... 524/544
See application file for complete search history.

(56) References Cited

U.S. PATENT DOCUMENTS

| | | | | |
|---|---|---|---|---|
| 8,785,564 | B2 * | 7/2014 | Saegusa | C08F 220/28 525/326.3 |
| 10,040,965 | B2 * | 8/2018 | Kitanohara | C09D 7/40 |
| 2009/0018271 | A1 | 1/2009 | Ohno et al. | |
| 2011/0200837 | A1 * | 8/2011 | Yoshizawa | G03G 15/2057 428/500 |
| 2013/0051880 | A1 * | 2/2013 | Yoshizawa | G03G 15/2053 399/333 |
| 2014/0051811 | A1 * | 2/2014 | Saegusa | C08G 18/6229 525/326.3 |
| 2016/0297984 | A1 * | 10/2016 | Kitanohara | C08G 18/6254 |

FOREIGN PATENT DOCUMENTS

| | | |
|---|---|---|
| JP | 4296178 B2 | 7/2009 |
| JP | 5821414 B2 | 11/2015 |
| JP | 5870480 B2 | 3/2016 |
| WO | 2016/201103 A1 | 12/2016 |

OTHER PUBLICATIONS

Jun. 3, 2019 Search Report issued in European Patent Application No. 18203577.4.

* cited by examiner

*Primary Examiner* — Michael Bernshteyn
(74) *Attorney, Agent, or Firm* — Oliff PLC

(57) ABSTRACT

Provided is a solution for forming a surface protective resin member, containing: a fluorine-containing acrylic resin having a hydroxyl value of 40 to 280; a fluorine-free acrylic resin having a hydroxyl value of 40 to 280; and a polyether polyol or a polyester polyol.

13 Claims, No Drawings

SOLUTION FOR FORMING SURFACE PROTECTIVE RESIN MEMBER, SOLUTION SET FOR FORMING SURFACE PROTECTIVE RESIN MEMBER, AND SURFACE PROTECTIVE RESIN MEMBER

CROSS-REFERENCE TO RELATED APPLICATIONS

This application is based on and claims priority under 35 USC 119 from Japanese Patent Application No. 2018-127860 filed on Jul. 4, 2018.

BACKGROUND

Technical Field

The present invention relates to a solution for forming a surface protective resin member, a solution set for forming a surface protective resin member, and a surface protective resin member.

Related Art

Conventionally, in various fields, from the viewpoint of suppressing scratches on the surface, a surface protective resin member such as a surface protective film is provided. Examples of applications of the surface protective resin member include protective films for protecting screens and bodies other than screens in portable devices such as mobile phones and portable game machines, car bodies and door handles, an exterior of a piano, various members of an image forming device (for example, an intermediate transfer member), or the like.

For example, Japanese Patent No. 5870480 discloses "a resin material for use in a member for an image forming device, which is formed by polymerizing an acrylic resin which has a content ratio (molar ratio) of a side chain hydroxyl group having a less than 10 of carbon atoms to a side chain hydroxyl group having 10 or more carbon atoms of less than ⅓ (including a case where the side chain hydroxyl group having 10 or more carbon atoms is not contained), a polyol which has a plurality of hydroxyl groups bonded via a chain having 6 or more carbon atoms, and an isocyanate at a polymerization ratio where the ratio (B/A) of a total molar amount (B) to a total molar amount (A) is 0.1 to 10, the total molar amount (A) being the molar amount of hydroxyl groups contained in all the acrylic resins used for polymerization, and the total molar amount (B) being the molar amount of hydroxyl groups contained in all the polyols used for polymerization".

Japanese Patent No. 4296178 discloses "a coating composition containing: a (meth)acrylic resin (A) having a hydroxyl group, which is obtained by copolymerizing a mixture containing a polycaprolactone-modified hydroxyalkyl (meth)acrylate and a (meth)acrylate containing a hydroxyl group different therefrom as essential components; a polyisocyanate compound (B) having a plurality of isocyanate groups; and a lactone polyol (C) having three or more hydroxyl groups, as essential components, wherein the hydroxyl group of the (meth)acrylate containing a hydroxyl group is a primary hydroxyl group, and the (meth)acrylic resin (A) has a hydroxyl value of 125 to 145".

Japanese Patent No. 5821414 discloses "a urethane resin laminate including: a substrate having a contact angle of water on at least one surface of 0° to 90°; an inner urethane resin layer containing a urethane resin having no fluorine atom in the molecular structure and having a thickness of 10 µm to 100 µm showing a self-repairing property; and an outer urethane resin layer containing a urethane resin having a fluorine atom in the molecular structure and having a thickness of 10 µm to 100 µm showing a self-repairing property in the above order such that the respective layers are in contact with each other".

SUMMARY

Aspects of non-limiting embodiments of the present disclosure relate to provide a solution for forming a surface protective resin member which is capable of forming a surface protective resin member having a long usable time and a high contact angle with respect to water, compared with a case where a solution for forming a surface protective resin member only contains a fluorine-containing acrylic resin having a hydroxyl value of 40 to 280, and a polyether polyol or a polyester polyol and a fluorine-free acrylic resin having a hydroxyl value of 40 to 280 is not used as a raw material of a surface protective resin member.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the invention, there is provided a solution for forming a surface protective resin member, containing: a fluorine-containing acrylic resin having a hydroxyl value of 40 to 280; a fluorine-free acrylic resin having a hydroxyl value of 40 to 280; and a polyether polyol or a polyester polyol.

DETAILED DESCRIPTION

Hereinafter, exemplary embodiments of the present invention are described. The exemplary embodiment is one example of implementing the present invention, and the present invention is not limited to the following embodiments.

<Solution for Forming Surface Protective Resin Member>

The solution for forming a surface protective resin member according to the exemplary embodiment contains: a fluorine-containing acrylic resin having a hydroxyl value of 40 to 280; a fluorine-free acrylic resin having a hydroxyl value of 40 to 280; and a polyether polyol or a polyester polyol.

In the present specification, the unit of the hydroxyl value is "mgKOH/g", but this unit may be omitted.

The solution for forming a surface protective resin member according to the exemplary embodiment is mixed with a solution containing a polyfunctional isocyanate and cured to be used, that is, the solution is used as a material for forming a surface protective resin member containing a polyurethane resin. When the solution for forming a surface protective resin member according to the exemplary embodiment has the above configuration, a solution for forming a surface protective resin member may be obtained, which is capable of forming a surface protective resin member having a long usable time and a high contact angle with respect to water.

The reasons for this are presumed as follows.

First, the surface protective resin member to be obtained when the solution for forming a surface protective resin member according to the exemplary embodiment (hereinafter simply referred to as "A solution") and the solution containing a polyfunctional isocyanate (hereinafter simply referred to as "B solution") are mixed and cured is described.

It is considered that the affinity between the fluorine-containing acrylic resin and the polyether polyol or the polyester polyol is not high due to the presence of fluorine atoms contained in the acrylic resin. Therefore, in a solution only containing a fluorine-containing acrylic resin and a polyether polyol or a polyester polyol, or in a mixed solution of the above solution with a solution containing a polyfunctional isocyanate, the fluorine-containing acrylic resin is easily separated from the polyether polyol or the polyester polyol, so that the usable time (so-called pot life) tends to be shortened.

On the other hand, the A solution of the exemplary embodiment contains a fluorine-free acrylic resin. It is considered that this fluorine-free acrylic resin has a high affinity for the polyether polyol or the polyester polyol, compared with the fluorine-containing acrylic resin, and also a high affinity for the fluorine-containing acrylic resin. Therefore, it is considered that, by containing the fluorine-free acrylic resin, the phenomenon of separating the fluorine-containing acrylic resin from the polyether polyol or the polyester polyol generated in the A solution or in the mixed solution of the A solution and the B solution is relaxed, and as a result, the usable time (pot life) is prolonged.

As for a film-like resin member obtained by mixing and curing the A solution and the B solution of the exemplary embodiment, focusing on the amount of the fluorine atom, the amount of the fluorine atom is low when observing the middle section in the thickness direction of the film, while the amount of the fluorine atom of both surfaces of the free standing film is larger than that of the middle cross section observing the surface side of the film.

However, in a case where the film is coated on a substrate, the amount of fluorine at an interface with the substrate is smaller than the amount of fluorine on the surface and may be as small as the amount of fluorine in the middle section. Therefore, it is considered that, the surface protective resin member obtained by mixing the A solution and the B solution according to the exemplary embodiment has the fluorine atoms unevenly distributed on the surface side, so that the contact angle with respect to water on the surface is increased by the influence of the unevenly distributed fluorine atoms.

In the exemplary embodiment, a solution for forming a surface protective resin member may be obtained, which is capable of forming a surface protective resin member having a long usable time and a high contact angle with respect to water.

Next, each component constituting the solution (A solution) for forming a surface protective resin member according to the exemplary embodiment is described in detail.

(a) Fluorine-Containing Acrylic Resin

The fluorine-containing acrylic resin in the exemplary embodiment refers to an acrylic resin containing a fluorine atom in the molecular structure thereof, and an acrylic resin having a hydroxyl group (—OH) is used as an acrylic resin. The fluorine-containing acrylic resin has a hydroxyl value of 40 mgKOH/g to 280 mgKOH/g.

The hydroxyl group is introduced, for example, by using a monomer having a hydroxyl group as a monomer to be a raw material of the acrylic resin. Examples of the monomer having a hydroxyl group include (1) an ethylenic monomer having a hydroxy group, such as hydroxymethyl (meth) acrylate, hydroxyethyl (meth)acrylate, hydroxypropyl (meth)acrylate, hydroxybutyl (meth)acrylate, and N-methylolacrylamide.

In addition, (2) an ethylenic monomer having a carboxy group, such as (meth)acrylic acid, crotonic acid, itaconic acid, fumaric acid, and maleic acid may be used.

Further, a monomer not having a hydroxyl group may be used in combination with the monomer to be a raw material of the acrylic resin. Examples of the monomer not having a hydroxyl group include an ethylenic monomer copolymerizable with the monomers (1) and (2), for example, alkyl (meth)acrylates such as methyl (meth)acrylate, ethyl (meth) acrylate, propyl (meth)acrylate, butyl (meth)acrylate, isobutyl (meth)acrylate, 2-ethylhexyl (meth)acrylate, n-octyl (meth)acrylate and n-dodecyl (meth)acrylate.

In the present specification, the term "(meth)acrylic acid" is a concept encompassing both acrylic acid and methacrylic acid. The term "(meth)acrylate" is a concept encompassing both acrylate and methacrylate.

Fluorine Atom

When a fluorine-containing acrylic resin containing a fluorine atom is used in the acrylic resin, it is easy to form a surface protective resin member having a high contact angle with respect to water.

The fluorine atom is introduced, for example, by using a monomer having a fluorine atom as a monomer to be a raw material of the acrylic resin. Examples of the monomer having a fluorine atom include 2-(perfluorobutyl)ethyl acrylate, 2-(perfluorobutyl)ethyl methacrylate, 2-(perfluorohexyl)ethyl acrylate, 2-(perfluorohexyl)ethyl methacrylate, perfluorohexylethylene, hexafluoropropene, hexafluoropropene epoxide, perfluoro(propyl vinyl ether) or the like.

The fluorine atom is preferably contained in the side chain of the fluorine-containing acrylic resin from the viewpoint of easily increasing the contact angle with respect to water. The number of carbon atoms in the side chain containing a fluorine atom is, for example, 2 to 20. In addition, the carbon chain in the side chain containing a fluorine atom may be a linear or branched chain.

The number of fluorine atoms contained in one molecule of the monomer containing a fluorine atom is not particularly limited, and is preferably 1 to 25, and more preferably 3 to 17.

The proportion of the fluorine atom contained in the fluorine-containing acrylic resin of the exemplary embodiment is preferably 1 mass % to 33 mass %, and more preferably 5 mass % to 20 mass %, with respect to the entire fluorine-containing acrylic resin.

When the proportion of the fluorine atom is 1 mass % or more, a surface protection member having a high contact angle with respect to water may be easily obtained, and when the proportion of the fluorine atom is 33 mass % or less, a solution with a long usable time may be easily obtained.

Hydroxyl Value

The fluorine-containing acrylic resin has a hydroxyl value of 40 mgKOH/g to 280 mgKOH/g. The hydroxyl value is preferably 70 mgKOH/g to 210 mgKOH/g.

When the hydroxyl value is 40 mgKOH/g or more, a polyurethane resin having a high crosslinking density is polymerized, and on the other hand, when the hydroxyl value is 280 mgKOH/g or less, a polyurethane resin having moderate flexibility may be obtained.

The hydroxyl value of the fluorine-containing acrylic resin is adjusted by the proportion of the monomer having a hydroxyl group in all the monomers synthesizing the fluorine-containing acrylic resin.

The hydroxyl value represents the mass of potassium hydroxide in milligrams required for acetylating the hydroxyl group in 1 g of the sample. The hydroxyl value in the exemplary embodiment is measured according to the method defined in JIS K 0070-1992 (potentiometric titration method). However, when the sample does not dissolve, a solvent such as dioxane or tetrahydrofuran (THF) is used.

The synthesis of the fluorine-containing acrylic resin is performed, for example, by mixing the above-mentioned monomers, and performing ordinary radical polymerization, ionic polymerization or the like, and followed by purification.

(b) Fluorine-Free Acrylic Resin

The fluorine-free acrylic resin in the exemplary embodiment refers to an acrylic resin not containing a fluorine atom in the molecular structure thereof, and an acrylic resin having a hydroxyl group (—OH) is used as an acrylic resin. The fluorine-free acrylic resin has a hydroxyl value of 40 mgKOH/g to 280 mgKOH/g.

A solution for forming a surface protective resin member having a long usable time may be obtained by using the (a) fluorine-containing acrylic resin and the (b) fluorine-free acrylic resin in combination.

Similar to the (a) fluorine-containing acrylic resin, the hydroxyl group is introduced, for example, by using a monomer having a hydroxyl group as a monomer to be a raw material of the acrylic resin. Examples of the monomer having a hydroxyl group also include those listed for the (a) fluorine-containing acrylic resin.

In addition, a monomer having no hydroxyl group may be used in combination, and examples of this monomer having no hydroxyl group also include those listed for the (a) fluorine-containing acrylic resin.

Hydroxyl Value

The fluorine-free acrylic resin has a hydroxyl value of 40 mgKOH/g to 280 mgKOH/g. The hydroxyl value is preferably 70 mgKOH/g to 210 mgKOH/g.

When the hydroxyl value is 40 mgKOH/g or more, a polyurethane resin having a high crosslinking density is polymerized, and on the other hand, when the hydroxyl value is 280 mgKOH/g or less, a polyurethane resin having moderate flexibility may be obtained.

The hydroxyl value of the fluorine-free acrylic resin is adjusted by the proportion of the monomer having a hydroxyl group in all the monomers synthesizing the fluorine-free acrylic resin.

The synthesis of the fluorine-free acrylic resin is performed, for example, by mixing the above-mentioned monomers, and performing ordinary radical polymerization, ionic polymerization or the like, and followed by purification.

Side Chain of Fluorine-Containing Acrylic Resin and Fluorine-Free Acrylic Resin

From the viewpoint of enhancing the compatibility between the fluorine-containing acrylic resin and the fluorine-free acrylic resin to increase the usable time, it is preferable that the side chain of the fluorine-containing acrylic resin and the fluorine-free acrylic resin has the following structure.

It is preferable that both the fluorine-containing acrylic resin and the fluorine-free acrylic resin have only a side chain having 30 or less carbon atoms (more preferably having 2 to 10 carbon atoms) as the side chain containing a hydroxyl group. In addition, the carbon chain in the side chain containing a hydroxyl group may be linear or branched.

It is preferable that both the fluorine-containing acrylic resin and the fluorine-free acrylic resin have only a side chain that is not bulky as a side chain not containing a hydroxyl group and not containing a fluorine atom. From this viewpoint, it is preferable to have only an aliphatic group. Further, it is preferable to have only an aliphatic group having 1 to 30 carbon atoms (more preferably 1 to 10 carbon atoms, and even more preferably 2 to 4 carbon atoms). The carbon chain in the side chain not containing a hydroxyl group and not containing a fluorine atom may be linear or branched.

From the viewpoint of obtaining a solution for forming a surface protective resin member capable of forming a surface protective resin member having a long usable time and a high contact angle with respect to water, the proportion of the fluorine-containing acrylic resin in the exemplary embodiment is preferably 10 mass % to 90 mass %, more preferably 30 mass % to 80 mass %, and still more preferably 40 mass % to 60 mass %, with respect to the total amount of the fluorine-containing acrylic resin and the fluorine-free acrylic resin.

The content of the fluorine atom is preferably 10 mass % or less with respect to the total amount of the fluorine-containing acrylic resin and the fluorine-free acrylic resin.

From the viewpoint of increasing the compatibility of both acrylic resins to prolong the usable time, in the exemplary embodiment, the ratio $[OH_A]/[OH_B]$ of the hydroxyl value $[OH_A]$ of the fluorine-containing acrylic resin to the hydroxyl value $[OH_B]$ of the fluorine-free acrylic resin is preferably ⅓ to 3, and more preferably ½ to 2.

From the viewpoint of compatibility, the weight average molecular weight Mw of the fluorine-containing acrylic resin and the fluorine-free acrylic resin in the exemplary embodiment is preferably 10,000 to 50,000, and more preferably 10,000 to 30,000.

In addition, from the viewpoint of increasing the compatibility of both acrylic resins to prolong the usable time, a ratio $[Mw_N]/[Mw_F]$ of the weight average molecular weight $[Mw_N]$ of the fluorine-free acrylic resin to the weight average molecular weight $[Mw_F]$ of the fluorine-containing acrylic resin is preferably 0.5 to 2.

The weight average molecular weight of the specific acrylic resin is measured by gel permeation chromatography (GPC). The measurement of the molecular weight by GPC is performed with a THF solvent using GPC·HLC-8120 GPC manufactured by Tosoh Corporation as a measuring apparatus, and using a Column·TSK gel Super HM-M (15 cm) manufactured by Tosoh Corporation. The weight average molecular weight and the number average molecular weight are calculated from this measurement result using a molecular weight calibration curve prepared from a monodisperse polystyrene standard sample.

(c) Polyether Polyol or Polyester Polyol

The polyether polyol represents a compound having a plurality of hydroxyl groups (—OH) and having an ether bond (—O—) in one molecule.

Examples of the polyether polyol include a multimer of a polyhydric alcohol, an adduct of a polyhydric alcohol and an alkylene oxide, a ring-opening polymer of an alkylene oxide, or the like.

Here, examples of the polyhydric alcohol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, hexanetriol, or the like.

Examples of the alkylene oxide include ethylene oxide, propylene oxide, butylene oxide, styrene oxide, epichlorohydrin, tetrahydrofuran, or the like.

The polyester polyol represents a compound having a plurality of hydroxyl groups (—OH) and having an ester bond "—C(=O)—O—" in one molecule. Examples of the polyester polyol include a ring-opening polymer of a lactone (e.g. ring-opening polymer of ε-caprolactone), or the like.

Examples of the lactone include ε-caprolactone, δ-valerolactone, γ-butyrolactone, β-propiolactone, α-acetolactone, or the like.

The polyether polyol or the polyester polyol in the exemplary embodiment is preferably a polyol (hereinafter simply referred to as "long-chain polyol") having a plurality of hydroxyl groups linked to each other by a chain having 6 or more carbon atoms (the number of carbon atoms in the straight chain portion linking the hydroxyl groups).

The long-chain polyol may have a functional group number (that is, the number of hydroxyl groups contained in one molecule of the long-chain polyol), for example, in a range of 2 to 5, or 2 to 3.

Examples of the long-chain polyol include a bifunctional polycaprolactone diol, a trifunctional polycaprolactone triol, a tetrafunctional or higher functional polycaprolactone polyol or the like.

Examples of the bifunctional polycaprolactone diol include a compound represented by the following General Formula (1).

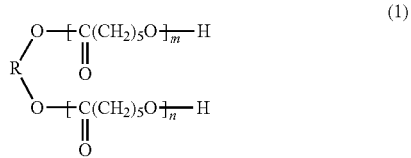

In General Formula (1), R represents an alkylene group or a divalent group formed by combining an alkylene group with one or more groups selected from —O— and —C(=O)—, and m and n each independently represents an integer of 1 to 35.

In General Formula (1), the alkylene group contained in the divalent group represented by R may be linear or branched. The alkylene group is, for example, preferably an alkylene group having 1 to 10 carbon atoms, and more preferably an alkylene group having 1 to 5 carbon atoms.

The divalent group represented by R is preferably a linear or branched alkylene group having 1 to 10 carbon atoms (preferably 2 to 5 carbon atoms), or preferably a group formed by linking two linear or branched alkylene groups having 1 to 5 carbon atoms (preferably 1 to 3 carbon atoms) with —O— or —C(=O)— (preferably —O—). Among these, the divalent groups represented by *—$C_2H_4$—*, *—$C_2H_4OC_2H_4$—*, or *—$C(CH_3)_2$—$(CH_2)_2$—* are more preferred. The divalent groups listed above are bonded at the "*" part, respectively.

m and n each independently represent an integer of 1 to 35, and preferably 2 to 5.

Examples of the trifunctional polycaprolactone diol include a compound having three groups each having a hydroxyl group in the terminal. The group having a hydroxyl group is represented by —[$CO(CH_2)_{n21}O]_{n22}$—H. Here, n21 represents 1 to 10, preferably 3 to 6, and more preferably 5, and n22 represents 1 to 50, preferably 1 to 10. Among these, the compound represented by the following General Formula (2) is preferred.

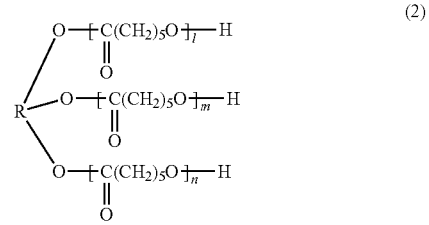

In General Formula (2), R represents a trivalent group formed by removing one hydrogen atom from an alkylene group, or a trivalent group formed by combining a trivalent group formed by removing one hydrogen atom from an alkylene group with one or more groups selected from an alkylene group, —O—, and —C(=O)—. l, m, and n each independently represent an integer of 1 to 28, and l+m+n is 3 to 30.

In General Formula (2), in a case where R represents the trivalent group formed by removing one hydrogen atom from an alkylene group, the group may be linear or branched. The alkylene group from which one hydrogen atom is removed to form the trivalent group is, for example, preferably an alkylene group having 1 to 10 carbon atoms, and more preferably an alkylene group having 1 to 6 carbon atoms.

The R may be a trivalent group formed by combing the trivalent group formed by removing one hydrogen atom from an alkylene group shown above with one or more groups selected from an alkylene group (for example, an alkylene group having 1 to 10 carbon atoms), —O—, and —C(=O)—.

The trivalent group represented by R is preferably a trivalent group formed by removing one hydrogen atom from a linear or branched alkylene group having 1 to 10 carbon atoms, preferably 3 to 6 carbon atoms. Among these, the trivalent group represented by *—$CH_2$—CH(—*)—$CH_2$—*, $CH_3$—C(—*)(—*)—$(CH_2)_2$—*, and $CH_3CH_2C$(—*)(—*)$(CH_2)_3$—* may be mentioned. The trivalent groups listed above are bonded at the "*" part, respectively.

l, m and n each independently represent an integer of 1 to 28, and preferably 2 to 6. l+m+n is 3 to 30, and preferably 6 to 18.

As the polyether polyol or the polyester polyol, a long-chain polyol containing a fluorine atom may be used.

Examples of the long-chain polyol containing a fluorine atom include a long-chain diol in which part or all of H atoms bonded to C atoms in a diol having 6 to 18 carbon atoms (for example, a diol in which two hydroxyl groups are bonded via an alkylene group having 6 to 18 carbon atoms) are replaced by F atoms; a long-chain glycol in which part or all of H atoms bonded to C atoms in a polyolefin glycol having 6 to 18 carbon atoms (for example, a polyolefin glycol having 6 to 18 carbon atoms which is obtained by polymerizing a plurality of olefin glycols such as ethylene glycol and propylene glycol) are replaced with F atoms, or the like. Specifically, 1H,1H,9H,9H-perfluoro-1,9-nonaniol, fluorinated tetraethylene glycol, 1H,1H,8H,8H-perfluoro-1,8-octanediol or the like may be mentioned.

The polyether polyol or the polyester polyol may be used alone, or two or more types thereof may be used in combination.

The addition amount of the polyether polyol or the polyester polyol may be adjusted such that the molar ratio $[OH_B]/[OH_A]$ of the fluorine-free acrylic resin and the content (total molar amount) $[OH_B]$ of the hydroxyl groups contained in the polyether polyol or the polyester polyol to the content (total molar amount) $[OH_A]$ of total hydroxyl groups contained in the fluorine-containing acrylic resin in a range of 0.1 to 10, and the range may be 0.1 to 4.

The polyether polyol or the polyester polyol preferably has a hydroxyl value of 30 mgKOH/g to 300 mgKOH/g, and more preferably 50 mgKOH/g to 250 mgKOH/g. It is inferred that when the hydroxyl value is 30 mgKOH/g or more, a polyurethane resin having a high crosslinking density is polymerized, and on the other hand, when the hydroxyl value is 300 mgKOH/g or less, a polyurethane resin having moderate flexibility may be obtained.

The above hydroxyl value represents the mass of potassium hydroxide in milligrams required for acetylating the hydroxyl group in 1 g of the sample. The above hydroxyl value in the exemplary embodiment is measured according to the method defined in JIS K 0070-1992 (potentiometric titration method). However, when the sample does not dissolve, a solvent such as dioxane or THF is used as a solvent.

<Solution Set for Forming Surface Protective Resin Member>

The solution set for forming a surface protective resin member according to the exemplary embodiment contains a first solution containing the solution (A solution) for forming a surface protective resin member according to the exemplary embodiment as described above, and a second solution (B solution) containing a polyfunctional isocyanate.

(d) Polyfunctional Isocyanate

The polyfunctional isocyanate reacts with, for example, the hydroxyl group of the fluorine-containing acrylic resin and the fluorine-free acrylic resin, the hydroxyl group of the polyether polyol or the polyester polyol, or the like. The polyfunctional isocyanate functions as a crosslinking agent that crosslinks acrylic resins (that is, fluorine-containing acrylic resins, fluorine-free acrylic resins, and the fluorine-containing acrylic resin and the fluorine-free acrylic resin), the acrylic resins and the polyether polyol or the polyester polyol, and polyether polyols or polyester polyols.

Examples of the polyfunctional isocyanate are not particularly limited and include a bifunctional diisocyanate such as methylene diisocyanate, toluene diisocyanate, hexamethylene diisocyanate, and isophorone diisocyanate. In addition, a polyfunctional isocyanate having a burette structure, an isocyanurate structure, an adduct structure, an elastic structure, or the like as a multimer of hexamethylene polyisocyanate is also preferably used.

Commercially available polyfunctional isocyanate may be used, for example, polyisocyanate (DURANATE) manufactured by Asahi Kasei Corporation.

Only one type of the polyfunctional isocyanate may be used, or two or more types thereof may be used by mixing.

(Other Additives)

In the exemplary embodiment, other additives may be contained in the first solution (A solution) or the second solution (B solution). Examples of the other additives include an antistatic agent, a reaction accelerator for accelerating the reaction of the hydroxyl groups (—OH) in the fluorine-containing acrylic resin (a), the fluorine-free acrylic resin (b) and the polyether polyol or the polyester polyol (c) with the isocyanate group (—NCO) in the polyfunctional isocyanate (d), or the like.

Antistatic Agent

Specific examples of the antistatic agent include cationic surface active compounds (e.g., a tetraalkylammonium salt, a trialkylbenzylammonium salt, an alkylamine hydrochloride, and an imidazolium salt), anionic surface active compounds (e.g., an alkyl sulfonate, an alkyl benzene sulfonate, and an alkyl phosphate), nonionic surfactant compounds (e.g., glycerin fatty acid ester, polyoxyalkylene ether, polyoxyethylene alkyl phenyl ether, N,N-bis-2-hydroxyethylalkylamine, hydroxyalkyl monoethanolamine, polyoxyethylene alkylamine, fatty acid diethanolamide, and polyoxyethylene alkylamine fatty acid ester), amphoteric surfactant compounds (e.g., alkyl betaine and alkyl imidazolium betaine), or the like.

In addition, examples of the antistatic agent include those containing quaternary ammonium.

Specifically, examples include tri-n-butylmethylammonium bistrifluoromethanesulfonimide, lauryl trimethyl ammonium chloride, octyldimethyl ethyl ammonium ethyl sulphate, didecyl dimethyl ammonium chloride, lauryl dimethyl benzyl ammonium chloride, stearyl dimethyl hydroxyethyl ammonium para-toluene sulfonate, tributylbenzylammonium chloride, lauryldimethylaminoacetic acid betaine, lauric acid amidopropyl betaine, octanoic acid amidopropyl betaine, polyoxyethylene stearylamine hydrochloride, or the like. Among these, tri-n-butylmethylammonium bistrifluoromethanesulfonimide is preferred.

In addition, an antistatic agent having a high molecular weight may be used.

Examples of the antistatic agent having a high molecular weight include a polymer compound obtained by polymerizing a quaternary ammonium base-containing acrylate, a polymer compound based on polystyrene sulfonic acid, a polymer compound based on polycarboxylic acid, a polyetherester-based polymer compound, a polymer compound based on ethylene oxide-epichlorohydrin, a polyetheresteramide-based polymer compound, or the like.

Examples of the polymer compound obtained by polymerizing a quaternary ammonium base-containing acrylate include a polymer compound having at least the following structural unit (A).

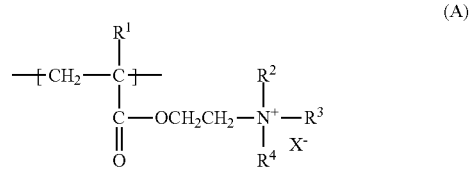

In structural unit (A), $R^1$ represents a hydrogen atom or a methyl group, $R^2$, $R^3$ and $R^4$ each independently represents an alkyl group, and $X^-$ represents an anion.

The polymerization of the antistatic agent having a high molecular weight may be performed by a known method.

As the antistatic agent having a high molecular weight, only a polymer compound composed of the same monomers may be used, or two or more types of polymer compounds composed of different monomers may be used in combination.

It is preferable to adjust the surface resistance of the surface protective resin member formed in the exemplary embodiment to be in the range of $1\times10^9 \Omega/\square$ to $1\times10^{14} \Omega/\square$, and to adjust the volume resistance thereof to be in the range of $1\times10^8$ $\Omega$cm to $1\times10^{13}$ $\Omega$cm.

The surface resistance and the volume resistance are measured in accordance with JIS-K6911 under the environment of 22° C. and 55% RH using a HIRESTA UP MCP-450 UR probe manufactured by Dia Instruments Co., Ltd.

The surface resistance and the volume resistance of the surface protective resin member are controlled by adjusting the type, content, or the like of the antistatic agent as long as the antistatic agent is contained.

The antistatic agent may be used alone, or may be used in combination of two or more thereof.

Reaction Accelerator

Examples of the reaction accelerator for accelerating the reaction of the hydroxyl group (—OH) in the fluorine-containing acrylic resin (a), the fluorine-free acrylic resin (b) and the polyether polyol or the polyester polyol (c) with the isocyanate group (—NCO) in the polyfunctional isocyanate (d) include a metal catalyst of tin or bismuth. Specifically, NEOSTANN U-28, U-50, U-600 and tin (II) stearate manufactured by NITTO KASEI Co., Ltd., may be mentioned. In addition, XC-C277 and XK-640 manufactured by Kusumoto Chemicals, Ltd. may be mentioned.

<Surface Protective Resin Member>

First Exemplary Embodiment

The surface protective resin member according to the first exemplary embodiment may be formed by mixing and curing the first solution (A solution) and the second solution (B solution) in the solution set for forming a surface protective resin member according to the above exemplary embodiment.

Due to a cured product of a mixed solution of the first solution (A solution) and the second solution (B solution), the surface protective resin member according to the first exemplary embodiment may obtain a surface protective resin member having a high contact angle with respect to water.

Second Exemplary embodiment

In addition, the surface protective resin member in the exemplary embodiment is not limited to a case of using the first solution (A solution) and the second solution (B solution).

That is, the surface protective resin member according to second exemplary embodiment may be formed by reacting and curing the fluorine-containing acrylic resin (a) having a hydroxyl value of 40 mgKOH/g to 280 mgKOH/g, the fluorine-free acrylic resin (b) having a hydroxyl value of 40 mgKOH/g to 280 mgKOH/g, the polyether polyol or the polyester polyol (c) and the polyfunctional isocyanate (d).

Due to a cured product of the fluorine-containing acrylic resin (a), the fluorine-free acrylic resin (b), the polyether polyol or the polyester polyol (c) and the polyfunctional isocyanate (d), the surface protective resin member according to the second exemplary embodiment may obtain a surface protective resin member having a high contact angle with respect to water.

Amount of Fluorine Atom

From the viewpoint of making it easier to increase the contact angle with respect to water, in the surface protective resin member according to the exemplary embodiment, the amount of the fluorine atom on the surface SM having a larger amount of the fluorine atom among one surface and the other surface opposite to the one surface (or the interface with the substrate) is preferably 10 atm % or more, and more preferably 20 atm % or more.

A method for controlling the amount of the fluorine atom on the surface SM of the surface protective resin member within the above range is not particularly limited, and examples thereof include a method of applying the surface protective resin member according to the first exemplary embodiment or the second exemplary embodiment as a surface protective resin member.

The amount of the fluorine atom in the surface protective resin member is measured under the following conditions by XPS measurement.

Measurement of the content of fluorine atoms with respect to the total amount of the coating film applied on the imide film as the substrate to a thickness of 30 μm is performed under the following conditions by an XPS analysis method while etching with cluster argon.

Measuring device: VERSA PROBE II manufactured by ULVAC-PHI, INCORPORATED.

X-ray source: monochromated Al Kα

X-ray beam diameter/power: 100 μm/25 W 15 Kv

Signal takeout angle: 45°

Path energy: 117.4 Ev

Measurement area: Survey spectrum

Acceleration voltage: 10 kV

Emission current: 20 mA

Charge Neutralization: neutralization gun condition 1.0 v/ion gun 10 v

Etching gun: gas cluster ion gun

Etching output: 5 kv

Etching area: 2 mm×2 mm

Formation of Surface Protective Resin Member

Here, the surface protective resin members according to the first exemplary embodiment, the second exemplary embodiment and the third exemplary embodiment may be formed by, for example, the following method. Hereinafter, a method of forming the surface protective resin member (a polymerization method of the resin) according to the exemplary embodiment is described by giving a specific example.

For example, an A solution containing the fluorine-containing acrylic resin (a), the fluorine-free acrylic resin (b), and the polyester polyol (c) and a B solution containing the polyfunctional isocyanate (d) are prepared. The A solution and the B solution are mixed, the mixture is defoamed under reduced pressure, and then casted on a base material (for example, a polyimide film) to form a resin layer. Next, the mixture is heated (for example, at 80° C. for 60 minutes, and then at 160° C. for 0.5 hours) and cured to form the surface protective resin member.

However, in the exemplary embodiment, the method of forming the surface protective resin member is not limited to the above method. For example, in a case of using a blocked polyfunctional isocyanate, it is preferable to cure by heating at a temperature at which the block is detached. Alternatively, the polymerization may be performed by methods of using ultrasonic waves instead of defoaming under reduced pressure, or allowing the mixed solution to stand for defoaming.

The thickness of the surface protective resin member is not particularly limited, and may be, for example, 10 μm to 100 μm, and may be 20 μm to 40 μm.

Contact Angle with Respect to Water

From a viewpoint of obtaining a surface protective resin member excellent in antifouling property, the surface protective resin member according to the exemplary embodiment preferably has a contact angle with respect to water of 95° to 140°, and more preferably 100° to 140°.

The contact angle is adjusted by controlling the amount of the fluorine atom contained in the fluorine-containing acrylic resin or the like.

The contact angle is measured using a contact angle meter (model number: CA-X, manufactured by Kyowa Interface Science Co., Ltd.).

Martens Hardness

The surface protective resin members according to the exemplary embodiment preferably have a Martens hardness at 23° C. of 0.5 N/mm$^2$ to 220 N/mm$^2$, more preferably 1 N/mm$^2$ to 70 N/mm$^2$, and still more preferably 1 N/mm$^2$ to 5 N/mm$^2$. When the Martens hardness (23° C.) is 0.5 N/mm$^2$ or more, the shape required for the resin member may be easily maintained. On the other hand, when the Martens hardness (23° C.) is 220 N/mm$^2$ or less, the ease of repairing a scratch (that is, self-repairing property) is improved.

Indentation Coefficient

The surface protective resin member according to the exemplary embodiment preferably has an indentation coefficient at 23° C. of 10 MPa to 300 MPa, and more preferably 20 MPa to 100 MPa. The indentation coefficient is an index indicating the flexibility of the resin material. That is, when the indentation coefficient (23° C.) is 300 MPa or less, the self-repairing property is improved.

Return Rate

The surface protective resin member according to the exemplary embodiment preferably has a return rate at 23° C. of 70% to 100%, more preferably 80% to 100%, and even more preferably 90% to 100%. The return rate is an index indicating the self-repairing property of the resin material (the property of restoring the strain generated by the stress at the time of unloading the stress, that is, the degree of repairing a scratch). That is, when the return rate (23° C.) is 70% or more, the ease of repairing a scratch (that is, self-repairing property) is improved.

The Martens hardness, the indentation coefficient and the return rate of the surface protective resin member is adjusted by controlling, for example: the hydroxyl value of the fluorine-containing acrylic resin (a); the hydroxyl value of the fluorine-free acrylic resin (b); the number of carbon atoms in the chain connecting the hydroxyl groups in the polyether polyol or the polyester polyol (c); the ratio of the polyether polyol or the polyester polyol (c) with respect to the total amount of the fluorine-containing acrylic resin (a) and the fluorine-free acrylic resin (b); the number of functional groups (isocyanate groups) in the polyfunctional isocyanate (d); and the ratio of the polyfunctional isocyanate (d) with respect to the total amount of the fluorine-containing acrylic resin (a) and the fluorine-free acrylic resin (b).

The Martens hardness, the indentation coefficient and the return rate is measured by using FISCHER SCOPE HM 2000 (manufactured by Fischer Instruments Co., Ltd.) as a measuring device, fixing a surface protective resin member (sample) to a slide glass with an adhesive and setting the two in the above measuring device. The surface protective resin member is loaded up to 0.5 mN for 15 seconds at a specific measurement temperature (23° C., for example), and held at 0.5 mN for 5 seconds. The maximum displacement at this time is set to be (h1). Thereafter, the load is reduced to 0.005 mM for 15 seconds, and held at 0.005 mN for 1 minute. The displacement when held at 0.005 mN for 1 minute is set to be (h2). Then the return rate [(h1−h2)/h1]×100(%) is calculated. From the load displacement curve at this time, the Martens hardness and the indentation coefficient may be obtained.

[Application]

The surface protective resin member according to the exemplary embodiment may be used as a surface protective member for an object having a possibility of causing scratches on the surface due to contact with foreign matter, for example.

Specifically, the surface protective resin member may be applied in screens and bodies other than screens in portable devices (e.g., mobile phones, and portable game machines), screens of touch panels, building materials (e.g., flooring materials, tiles, wall materials, and wallpaper), automobile members (e.g., car interiors, car bodies, and door handles), storage containers (e.g., suitcases), cosmetic containers, eyeglasses (e.g., frames and lenses), sporting goods (e.g., golf clubs and rackets), writing utensils (e.g., fountain pens), musical instruments (e.g., an exterior of a piano), clothes storage tool e.g., hanger), members for an image forming device such as a copying machine (e.g., a transfer member such as a transfer belt), leather goods (e.g., bags and school bags), decorative films, film mirrors, or the like.

EXAMPLES

Hereinafter, the present invention is described in more detail with reference to Examples and Comparative Examples, but the present invention is not limited to the following examples. In the following, "part" is on a mass basis unless otherwise specified particularly.

<Synthesis of Fluorine-Containing Acrylic Resin Prepolymer a1>

Monomers of n-butyl methacrylate (nBMA), hydroxyethyl methacrylate (HEMA) and fluorine atom-containing acrylic monomer (FAMAC 6, manufactured by UNIMATEC CO., LTD.) are mixed in a molar ratio of 2.5:3:0.5. Further, a monomer solution is prepared by adding 2 mass % of polymerization initiator (azobisisobutyronitrile (AIBN)) in proportion to monomers and 40 mass % of methyl ethyl ketone (MEK) in proportion to monomers.

The monomer solution is charged into a dropping funnel and added dropwise to 50 mass % of MEK in proportion to monomers, heated to 80° C. under a nitrogen reflux, during stirring over 3 hours for polymerization. Further, a solution containing 10 mass % of MEK in proportion to monomers and 0.5 mass % of AIBN in proportion to monomers is added dropwise over 1 hour to complete the reaction. During the reaction, the temperature is kept at 80° C. and stirring is continued. Thus, a fluorine-containing acrylic resin prepolymer a1 solution (solid content: 50 mass %) is synthesized.

The hydroxyl value of the obtained fluorine-containing acrylic resin prepolymer a1 is measured according to the method defined in JIS K 0070-1992 (potentiometric titration method), and as a result, the hydroxyl value is 175 mgKOH/g.

In addition, a part of the fluorine-containing acrylic resin prepolymer a1 is separated by removing the solvent, and the obtained solid content is diluted to 0.1 mass % with tetrahydrofuran and subjected to GPC (Gel Permeation Chromatography), so as to measure the weight average molecular weight. As a result, the weight average molecular weight in terms of polystyrene is 15900.

The content of fluorine in the fluorine-containing acrylic resin prepolymer a1 is 12.9 mass % with respect to the total amount of the fluorine-containing acrylic resin prepolymer a1.

<Synthesis of Fluorine-Containing Acrylic Resin Prepolymer a3>

Monomers of n-butyl methacrylate (nBMA), hydroxyethyl methacrylate (HEMA) and fluorine atom-containing acrylic monomer (FAMAC 6, manufactured by UNIMATEC CO., LTD.) are mixed in a molar ratio of 2.96:2.79:0.25.

Further, a monomer solution is prepared by adding 2 mass % of a polymerization initiator (azobisisobutyronitrile (AIBN)) in proportion to monomers and 40 mass % of methyl ethyl ketone (MEK) in proportion to monomers.

The monomer solution is charged into a dropping funnel and added dropwise to 50 mass % of MEK in proportion to monomers, heated to 80° C., under a nitrogen reflux over 3 hours for polymerization. Further, a solution containing 10 mass % of MEK in proportion to monomers and 0.5 mass % of AIBN in proportion to monomers is added dropwise over 1 hour to complete the reaction. During the reaction, the temperature is kept at 80° C. and stirring is continued. Thus, a fluorine-containing acrylic resin prepolymer a3 solution (solid content: 50 mass %) is synthesized.

The hydroxyl value of the obtained fluorine-containing acrylic resin prepolymer a3 is measured according to the method (potentiometric titration method) defined in JIS K 0070-1992, and as a result, the hydroxyl value is 175 mgKOH/g.

In addition, a part of the fluorine-containing acrylic resin prepolymer a3 is separated by removing the solvent, and the obtained solid content is diluted to 0.1 mass % with tetrahydrofuran and subjected to GPC (Gel Permeation Chromatography), so as to measure the weight average molecular weight. As a result, the weight average molecular weight in terms of polystyrene is 16300.

The content of fluorine in the fluorine-containing acrylic resin prepolymer a3 is 6.9 mass % with respect to the total amount of the fluorine-containing acrylic resin prepolymer a3.

<Synthesis of Fluorine-Free Acrylic Resin Prepolymer b1>

Monomers of n-butyl methacrylate (nBMA) and hydroxyethyl methacrylate (HEMA) are mixed in a molar ratio of 3:3. Further, a monomer solution is prepared by adding 2 mass % of polymerization initiator (azobisisobutyronitrile (AIBN)) in proportion to monomers and 40 mass % of methyl ethyl ketone (MEK) in proportion to monomers.

The monomer solution is charged into a dropping funnel and added dropwise to 50 mass % of MEK in proportion to monomers, heated to 80° C., under a nitrogen reflux over 3 hours for polymerization. Further, a solution containing 10 mass % of MEK in proportion to monomers and 0.5 mass % of AIBN in proportion to monomers is added dropwise over 1 hour to complete the reaction. During the reaction, the temperature is kept at 80° C. and stirring is continued. Thus, a fluorine-free acrylic resin prepolymer b1 solution (solid content: 50 mass %) is synthesized.

The hydroxyl value of the obtained fluorine-free acrylic resin prepolymer b1 is measured according to the method defined in JIS K 0070-1992 (potentiometric titration method), and as a result, the hydroxyl value is 206 mgKOH/g.

In addition, a part of the fluorine-free acrylic resin prepolymer b1 is separated by removing the solvent, and the obtained solid content is diluted to 0.1 mass % with tetrahydrofuran and subjected to GPC (Gel Permeation Chromatography), so as to measure the weight average molecular weight. As a result, the weight average molecular weight in terms of polystyrene is 17100.

Example 1

<Preparation of A1 Solution>

The following components are mixed to prepare an A1 solution.

Fluorine-containing acrylic resin prepolymer a1 solution: 3.5 Parts

Fluorine-free acrylic resin prepolymer b1 solution: 0.9 part

Polyester polyol (polycaprolactone triol, PLACCEL 308, manufactured by Daicel Corporation, having a molecular weight of 850 and a hydroxyl value of 190 mgKOH/g to 200 mgKOH/g): 3.9 parts <Formation of Resin Layer A1>

The following B1 solution is added to the following A1 solution and the mixture is defoamed under reduced pressure for 10 minutes. The resultant is casted on a 90 μm-thick imide film and cured at 80° C. for 1 hour and then at 130° C. for 30 minutes to obtain a resin layer A1 with a film thickness of 30 μm.

The above A1 solution: 8.3 parts

B1 solution (isocyanate, DURANATE TPA 100, manufactured by Asahi Kasei Chemicals Corporation, compound name: polyisocyanurate form of hexamethylene diisocyanate): 4.1 parts Example 2

An A2 solution is prepared in the same manner as in Example 1, except that in the preparation of the A1 solution, the fluorine-containing acrylic resin prepolymer a1 solution is changed to 2.6 parts, the fluorine-free acrylic resin prepolymer b1 solution is changed to 1.8 parts, and the PLACCEL 308 is changed to 4.2 parts.

A resin layer A2 is formed in the same manner as in Example 1 except that in the formation of the resin layer A1, the A2 solution is used instead of the A1 solution and DURANAE TPA 100 is changed to 4.3 parts.

Example 3

An A3 solution is prepared in the same manner as in Example 1, except that in the preparation of the A1 solution, the fluorine-containing acrylic resin prepolymer a1 solution is changed to 1.7 parts, the fluorine-free acrylic resin prepolymer b1 solution is changed to 2.7 parts, and the PLACCEL 308 is changed to 4.6 parts.

A resin layer A3 is formed in the same manner as in Example 1 except that in the formation of the resin layer A1, the A3 solution is used instead of the A1 solution and DURANATE TPA 100 is changed to 4.6 parts.

Example 4

An A4 solution is prepared in the same manner as in Example 1, except that in the preparation of the A1 solution, the fluorine-containing acrylic resin prepolymer a1 solution is changed to 0.9 part, the fluorine-free acrylic resin prepolymer b1 solution is changed to 3.6 parts, and the PLACCEL 308 is changed to 4.9 parts.

A resin layer A4 is formed in the same manner as in Example 1 except that in the formation of the resin layer A1, the A4 solution is used instead of the A1 solution and DURANATE TPA 100 is changed to 4.9 parts.

Comparative Example 1

An A11 solution is prepared in the same manner as in Example 1, except that in the preparation of the A1 solution, the fluorine-containing acrylic resin prepolymer a1 solution is changed to 4.3 parts, the fluorine-free acrylic resin prepolymer b1 solution is changed to 0 part, and the PLACCEL 308 is changed to 3.6 parts.

A resin layer A11 is formed in the same manner as in Example 1 except that in the formation of the resin layer A1, the A11 solution is used instead of the A1 solution and DURANATE TPA 100 is changed to 3.8 parts.

Comparative Example 2

An A12 solution is prepared in the same manner as in Example 1, except that in the preparation of the A1 solution, the fluorine-containing acrylic resin prepolymer a1 solution is changed to 0 part, the fluorine-free acrylic resin prepolymer b1 solution is changed to 4.4 part, and the PLACCEL 308 is changed to 5.2 parts.

A resin layer A12 is formed in the same manner as in Example 1 except that in the formation of the resin layer A1, the A12 solution is used instead of the A1 solution and DURANATE TPA 100 is changed to 5.2 parts.

Comparative Example 3

An A13 solution is prepared in the same manner as in Example 1, except that in the preparation of the A1 solution, the fluorine-containing acrylic resin prepolymer a3 solution is changed to 4.3 parts, the fluorine-free acrylic resin prepolymer b1 solution is changed to 0 part, and the PLACCEL 308 is changed to 3.6 parts.

A resin layer A13 is formed in the same manner as in Example 1 except that in the formation of the resin layer A1, the A13 solution is used instead of the A1 solution and DURANATE TPA 100 is changed to 3.8 parts.

[Evaluation on Resin Layer]

—Martens Hardness at 23° C., Indentation Coefficient and Return Rate—

The Martens hardness, the indentation coefficient and the return rate are measured for each of the resin layers obtained in the above Examples and Comparative Examples by the following methods. The results are shown in Table 1.

FISCHER SCOPE HM 2000 (manufactured by Fischer Instruments Co., Ltd.) is used as a measuring device, the Imide surface of the obtained resin layer is fixed to a slide glass with an adhesive and the two are set in the above measuring device. The resin layer is loaded up to 0.5 mN for 15 seconds at room temperature (23° C.) over a period of 15 seconds and held at 0.5 mN for 5 seconds. The maximum displacement at this time is set to be (h1). Thereafter, the load is reduced to 0.005 mM for 15 seconds, and held at 0.005 mN for 1 minute. The displacement when held at 0.005 mN for 1 minute is set to be (h2). Then the return rate "[(h1−h2)/h1]×100(%)" is calculated. From the load displacement curve at this time, the Martens hardness and the indentation coefficient is obtained.

—Contact Angles with respect to Various Liquids—

The contact angles with respect to water and hexadecane are measured for each of the resin layers obtained in the above Examples and Comparative Examples by the following method. The results are shown in Table 1.

The contact angle is measured by respectively dropping 1 µl of water and hexadecane on the surface of the substrate with a syringe using a contact angle meter (model number: CA-X, manufactured by Kyowa Interface Science Co., Ltd.).

—Usable Time (Pot Life)—

The usable time (pot life) of the solutions used for forming the respective resin layers obtained in the above Examples and Comparative Examples is measured by the following method. The results are shown in Table 1.

100 ml of a mixture of the A solution and the B solution is placed in a glass bottle having a diameter (inner diameter) of 55 mm, a stirring rod having three blades, having a diameter of 25 mm is set, and the torque is measured while stirring at 50 rpm. Thereafter, the time when the torque suddenly rises during dropping 10% NEOSTANN U 600 solution as a catalyst therein (the time until the torque reaches twice the initial value at the measuring temperature of 25° C. by a method according to JIS K 6870 (2008)) is recorded as the usable time.

—Amount of Fluorine Atom—

The amount of the fluorine atom on the front side surface $S_M$, the amount of the fluorine atom on the interface $S_L$ with the imide film, and the amount of the fluorine atom on the cross section $S_{50}$ having a thickness of 50% from the front side surface $S_M$ to the interface $S_L$ with the imide film are measured for each of the resin layers obtained in the above Examples and Comparative Examples by the above method (XPS measurement).

In addition, the amounts of the fluorine atom on the cross sections at each interval of 40 nm from the front side surface $S_M$ to the interface $S_L$ with the imide film are measured for each of the resin layers obtained in Example 2 and Comparative Example 1. The results are shown in Table 2.

TABLE 1

| | | Example 1 | Example 2 | Example 3 | Example 4 | Comparative Example 1 | Comparative Example 2 | Comparative Example 3 |
|---|---|---|---|---|---|---|---|---|
| Proportion of fluorine-containing acrylic resin (a) with respect to total amount of fluorine-containing acrylic resin (a) and fluorine-free acrylic resin (b) (wt %) | | 80 | 60 | 40 | 20 | 100 | 0 | 100 |
| Content of fluorine in resin layer (wt %) | | 10.32 | 7.74 | 5.16 | 2.58 | 12.9 | 0 | 6.9 |
| Contact angle (°) | Water | 105.9 | 105.9 | 105.4 | 103.7 | 105.2 | 77.4 | 100.6 |
| | Hexadecane | 50.1 | 49.5 | 50.1 | 46.1 | 51.7 | 12.8 | 41.2 |
| Picodentor | Martens hardness (N/mm$^2$) | 3.64 | 3.42 | 3.94 | 4.4 | 3.46 | 2.84 | 3.3 |
| | Indentation coefficient (MPa) | 66.2 | 63.7 | 74.4 | 80 | 61.7 | 45.2 | 62 |
| | Return rate (%) | 88.7 | 85.9 | 85 | 97.7 | 86.8 | 89.8 | 89 |
| Pot life | Catalyst 0.3% (h) | 1.2 | 1.5 | 1.6 | 1.8 | 1 | 2 | 1 |
| | Catalyst 0.1% (h) | 26 h | 30 h | 30 h | 34 h | 20 h | 36 h | 20 h |

TABLE 1-continued

| | Example 1 | Example 2 | Example 3 | Example 4 | Comparative Example 1 | Comparative Example 2 | Comparative Example 3 |
|---|---|---|---|---|---|---|---|
| Amount of fluorine atom on front side surface $S_M$ (atm %) | 20.98 | 21.12 | 20.65 | 20.12 | 21.24 | 0 | 17.26 |
| Amount of fluorine atom on imide film side interface $S_L$ (atm %) | 0.92 | 0.11 | 0.85 | 0.06 | 0.55 | 0 | 0.25 |
| Amount of fluorine atom on 50% cross section $S_{50}$ in thickness direction (atm %) | 0.76 | 0.25 | 0.35 | 0.12 | 0.56 | 0 | 0.35 |

TABLE 2

| Depth [μm] | Example 2 (F content [atm %]) | Comparative Example 1 (F content [atm %]) |
|---|---|---|
| 0 | 21.12 | 21.24 |
| 1 | 1.45 | 2.89 |
| 2 | 0.89 | 0.86 |
| 3 | 0.85 | 0.12 |
| 10 | 0.35 | 0.35 |
| 15 | 0.25 | 0.56 |
| 20 | 0.54 | 0.24 |
| 25 | 0.53 | 0.76 |
| 30 | 0.11 | 0.55 |

As shown in Table 1, it is seen that, a surface protective resin member having a long pot life and a high contact angle with respect to water is obtained in the Examples in which a resin member is formed using an A solution containing a fluorine-containing acrylic resin and a fluorine-free acrylic resin in combination, compared with the Comparative Examples in which a resin member is formed using an A solution not containing a fluorine-containing acrylic resin and a fluorine-free acrylic resin in combination.

Particularly, when comparing Examples 2 and 3 with Comparative Example 3 in which the fluorine contents in the resin layer are about the same, it is seen that in Examples 2 and 3, the pot life is longer and the contact angle with respect to water is higher.

In addition, as shown in Tables 1 and 2, it is seen that, the fluorine content in the resin layer in Example 2 is considerably lower than that in Comparative Example 1, but the amounts of the fluorine atom on the front side surfaces $S_M$ of both resin layers are about the same.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A solution for forming a surface protective resin member, comprising:
a fluorine-containing acrylic resin having a hydroxyl value of 40 to 280;
a fluorine-free acrylic resin having a hydroxyl value of 40 to 280; and
a polyether polyol or a polyester polyol.

2. The solution for forming a surface protective resin member according to claim 1, wherein a content of fluorine in the fluorine-containing acrylic resin is 1 mass % to 33 mass % with respect the fluorine-containing acrylic resin.

3. The solution for forming a surface protective resin member according to claim 1, wherein a proportion of the fluorine-containing acrylic resin is 10 mass % to 90 mass % with respect to a total amount of the fluorine-containing acrylic resin and the fluorine-free acrylic resin.

4. The solution for forming a surface protective resin member according to claim 1, wherein a ratio $[OH_A]/[OH_B]$ of the hydroxyl value $[OH_A]$ of the fluorine-containing acrylic resin to the hydroxyl value $[OH_B]$ of the fluorine-free acrylic resin is ⅓ to 3.

5. A solution set for forming a surface protective resin member, the solution set comprising: a first solution containing the solution according to claim 1; and a second solution containing a polyfunctional isocyanate.

6. A surface protective resin member that is a cured product of: a fluorine-containing acrylic resin having a hydroxyl value of 40 to 280; a fluorine-free acrylic resin having a hydroxyl value of 40 to 280; a polyether polyol or a polyester polyol; and a multifunctional isocyanate.

7. The surface protective resin member according to claim 6, wherein a contact angle with respect to water is 95° to 140°.

8. The solution for forming a surface protective resin member according to claim 2, wherein a proportion of the fluorine-containing acrylic resin is 10 mass % to 90 mass % with respect to a total amount of the fluorine-containing acrylic resin and the fluorine-free acrylic resin.

9. The solution for forming a surface protective resin member according to claim 2, wherein a ratio $[OH_A]/[OH_B]$ of the hydroxyl value $[OH_A]$ of the fluorine-containing acrylic resin to the hydroxyl value $[OH_B]$ of the fluorine-free acrylic resin is ⅓ to 3.

10. The solution for forming a surface protective resin member according to claim 3, wherein a ratio $[OH_A]/[OH_B]$ of the hydroxyl value $[OH_A]$ of the fluorine-containing acrylic resin to the hydroxyl value $[OH_B]$ of the fluorine-free acrylic resin is ⅓ to 3.

11. A solution set for forming a surface protective resin member, the solution set comprising: a first solution containing the solution according to claim 2; and a second solution containing a polyfunctional isocyanate.

12. A solution set for forming a surface protective resin member, the solution set comprising: a first solution containing the solution according to claim 3; and a second solution containing a polyfunctional isocyanate.

13. A solution set for forming a surface protective resin member, the solution set comprising: a first solution containing the solution according to claim 4; and a second solution containing a polyfunctional isocyanate.

* * * * *